(12) United States Patent
Kluge

(10) Patent No.: US 9,091,437 B2
(45) Date of Patent: *Jul. 28, 2015

(54) SYSTEM CONCEPT WITH LOW ENERGY REQUIREMENT AND IMPROVED ENERGY YIELD

(75) Inventor: Claus Peter Kluge, Röslau (DE)

(73) Assignee: CeramTec GmbH, Plochingen (DE)

( * ) Notice: Subject to any disclaimer, the term of this patent is extended or adjusted under 35 U.S.C. 154(b) by 994 days.

This patent is subject to a terminal disclaimer.

(21) Appl. No.: 12/529,596

(22) PCT Filed: Mar. 5, 2008

(86) PCT No.: PCT/EP2008/052674
§ 371 (c)(1),
(2), (4) Date: Sep. 2, 2009

(87) PCT Pub. No.: WO2008/107458
PCT Pub. Date: Sep. 12, 2008

(65) Prior Publication Data
US 2010/0050629 A1    Mar. 4, 2010

(30) Foreign Application Priority Data

Mar. 6, 2007  (DE) .................. 10 2007 011 195
Feb. 27, 2008 (DE) .................. 10 2008 000 417

(51) Int. Cl.
| F02G 1/043 | (2006.01) |
| F02G 1/055 | (2006.01) |
| F23G 7/06  | (2006.01) |
| H01M 8/04  | (2006.01) |
| H01M 8/06  | (2006.01) |

(52) U.S. Cl.
CPC ........... *F23G 7/061* (2013.01); *H01M 8/04007* (2013.01); *H01M 8/04201* (2013.01); *H01M 8/0662* (2013.01); *H01M 2250/405* (2013.01); *Y02B 90/16* (2013.01); *Y02E 20/12* (2013.01); *Y02E 60/50* (2013.01)

(58) Field of Classification Search
CPC .......... F02G 1/043; F02G 1/055; Y02E 20/12
USPC .................................... 60/517, 645
See application file for complete search history.

(56) References Cited

U.S. PATENT DOCUMENTS

| 6,548,197 | B1  |    | 4/2003  | Chandran et al. |
| 8,057,947 | B2  | *  | 11/2011 | Foger et al. ............ 429/442 |
| 2003/0143448 | A1 |  | 7/2003  | Keefer |
| 2004/0251241 | A1 |  | 12/2004 | Blutke et al. |
| 2006/0003207 | A1 | * | 1/2006 | Balan et al. ............ 429/26 |
| 2006/0053792 | A1 | * | 3/2006 | Bourgeois ............... 60/670 |

(Continued)

FOREIGN PATENT DOCUMENTS

| EP | 1 136 542 A  |   | 9/2001  |
| EP | 1 475 429 A  |   | 11/2004 |
| EP | 1475429 A1   | * | 11/2004 |

*Primary Examiner* — Karie O'Neill Apicella
(74) *Attorney, Agent, or Firm* — Norton Rose Fulbright US LLP

(57) ABSTRACT

The invention relates to a method for the environmentally sound disposal of air/solvent mixtures made of combustible gaseous, vaporous or liquid waste products, using a combustion unit for burning the air/solvent mixtures while removing the environmentally compatible exhaust air developing in the combustion unit and the waste heat that is produced.

34 Claims, 4 Drawing Sheets

(56) References Cited

U.S. PATENT DOCUMENTS

| | | |
|---|---|---|
| 2006/0254283 A1* | 11/2006 | Savic et al. .................... 60/775 |
| 2007/0006565 A1* | 1/2007 | Fleischer et al. .............. 60/39.5 |
| 2007/0081930 A1* | 4/2007 | Menian ........................ 422/205 |
| 2008/0041829 A1 | 2/2008 | Blutke et al. |
| 2010/0047639 A1* | 2/2010 | Kluge et al. ................... 429/17 |

* cited by examiner

SYSTEM CONCEPT WITH LOW ENERGY REQUIREMENT AND IMPROVED ENERGY YIELD

This application is a §371 of PCT/EP2008/052674 filed Mar. 5, 2008, and claims priority from DE 10 2007 011 195.0 filed Mar. 6, 2007 and DE 10 2008 000 417.0 filed Feb. 27, 2008.

FIELD OF THE INVENTION

The invention relates to a method for the environmentally sound disposal of air/solvent mixtures which consist of combustible gaseous, vaporous or liquid waste materials, with a combustion unit for the combustion of the air/solvent mixtures, along with the discharge of the environmentally compatible exhaust air (2) occurring in the combustion unit and of the generated waste heat.

BACKGROUND OF THE INVENTION

According to the prior art (see FIGS. 1 and 2), for example, air/solvent mixtures have to be delivered for thermal postcombustion (TPC), so as not to cause any harmful substances to enter the environment. For reasons of prescribed safety, for example, air/solvent mixtures, such as leave the user process, must be diluted with air to an extent such that no ignitable mixture occurs. This depleted air is delivered for thermal postcombustion. Sometimes, for this purpose, the mixture air is preheated by means of the waste heat from the subsequent combustion process, before it reaches the combustion chamber for thermal postcombustion.

The air/solvent mixture, preheated or not, enters the combustion chamber, and this is usually fired with fuel, for example fuel gas or electric energy. Catalytic postcombustions may also be envisaged.

If a fuel cell (FC) is used instead of thermal postcombustion, the air/solvent mixture can also be burnt, for example, in order to maintain the operating temperature. The electric current is generated via a separate circuit of fuel gas or combustible materials.

The concepts according to the prior art require fuel gas in order to burn combustible materials.

OBJECTS OF THE INVENTION

The object underlying the invention is to improve a method for the environmentally sound disposal of air/solvent mixtures according to the present invention, so that the air/solvent mixtures can be decomposed without the continuous supply of combustible materials.

SUMMARY OF THE INVENTION

This object is achieved, according to the invention, in that the air/solvent mixtures are delivered partially or completely to a recovery unit and are converted there into a usable energy form, and these are delivered partially or completely to the combustion unit for combustion, and as a result, during operation, the combustion unit is automatically supplied partially or completely with fuel. Air/solvent mixtures are understood to mean air and/or inert gas and/or mixtures thereof with combustible or burnable materials (also designated below as mixture).

Figure 1:
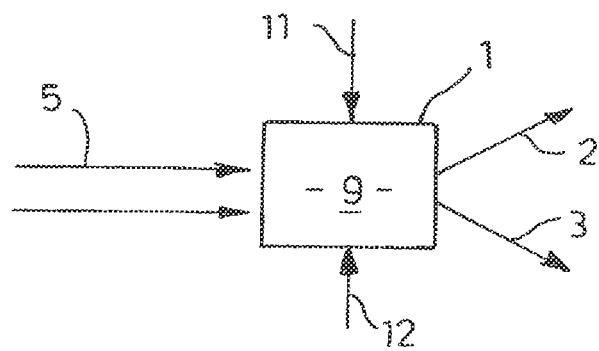
FIG. 1 is a diagram of a prior art configuration of combustion unit with a thermal post combustion plant.

According to the invention, the usable energy form is preferably current, gas, steam or a burnable or combustible condensate. The condensate is dealt with in detail further below.

In an inventive refinement, the air/solvent mixtures in the recovery unit are delivered to a Stirling engine, and current is generated, for example in combination with a generator. The air/solvent mixtures drive the Stirling engine, and the latter drives the generator.

In another inventive refinement, the air/solvent mixtures in the recovery unit are converted into steam in a steam conversion plant, and the steam is delivered for use.

In one form of use, the steam is delivered to a generator for the generation of current.

In another form of use, the air/solvent mixtures in the recovery unit are condensed out in a condensation device, and the burnable condensate obtained is burnt in the combustion unit.

According to the invention, the waste heat generated in the combustion unit and/or the current are/is delivered to the recovery unit for condensing out the air/solvent mixture.

The method or plant concept, according to the invention, during operation, utilizes largely or solely the energy which is contained in the combustible material which has previously been condensed out from the air/solvent mixture. Only the start-up may optionally take place by means of a conventional fuel, such as fuel gas.

In a refinement according to the invention, the condensate generated in the recovery unit or, in general, the usable energy forms generated in the recovery unit is/are conducted into a tank and from there is/are delivered, as required, to the combustion unit. The tank also serves as a buffer and can be filled with a quantity of combustible material (fuel) necessary for starting up the plant. A further tank may also be used for the intermediate storage of burnable and/or combustible materials or of the mixture.

In a development of the invention, the combustion unit is a conventional thermal postcombustion plant and/or a fuel cell plant or, in general, an energy conversion system which generates heat and/or cold or electric energy from materials.

In a further refinement of the invention, the recovery unit is an absorption plant, condensation plant, inversion cold plant or adsorption plant.

Preferably, the combustion unit is operated uniformly by means of a continuous extraction of condensate from the tank.

The condensate in the tank, in one refinement, is of non-fossil origin, such as bioethanol or biobutanol.

In a development of the invention, in the recovery unit, pure materials are processed from combustible or burnable materials or else mixtures of at least two different combustible or burnable materials which can also be mixed with non-combustible or non-burnable materials, such as, for example, water.

The combustion unit may also be operated under partial operation conditions, in which case, in addition to the condensate from the tank, fuel-gas/fuel and/or electrical current and/or supply air also are/is introduced into the combustion unit for combustion.

In a development of the invention, the burnable or combustible materials are removed completely or virtually completely from the mixture or the air/solvent mixture, and the residual gas fraction from the mixture is delivered to the supply air of the combustion unit.

In an inventive refinement, the heat quantity or waste heat occurring in the combustion unit is utilized partially or completely in order to operate a Stirling engine.

The energy converted in the Stirling engine is preferably utilized for drive purposes. The Stirling engine can also drive a generator which generates electric energy. Thus, the air/solvent mixture in the recovery unit is transformed into current as usable energy form. This current can then be introduced into the combustion unit again for the combustion of the air/solvent mixture.

In another application, the heat quantity occurring in the combustion unit is utilized partially or completely in order to generate steam.

The steam obtained can then be utilized again for drive purposes.

In an inventive refinement, the steam drives a generator which generates electric energy, that is to say current.

The steam obtained may also be utilized for sterilization purposes.

In a preferred inventive refinement, the heat energy delivered from the combustion unit to the recovery unit is distributed in the recovery unit to various types of use. That is to say, various usable energy forms are generated in the recovery unit.

In one form of use, in the recovery unit, various types of use are cascaded or operated in combination.

During operation, then, the method or plant concept according to the invention utilizes largely or solely the energy which is contained in the burnable material which, for example, has previously been condensed out of the air/solvent mixture. Only the start-up may optionally take place by means of a conventional fuel gas, or the tank provided as a buffer in the plant may be filled with a quantity of burnable material necessary for starting up the plant.

By means of the waste heat occurring during combustion in the combustion unit, then, for example, an inversion cooling plant or else an adsorption plant may be operated, which, as an integral part of the method or plant concept, condenses the fuel necessary for self-operation out of the air/solvent mixture. From environmental standpoints, therefore, the demand for fossil fuel gas would lapse.

If this method or plant concept is operated with thermal postcombustion, the burnable liquid material is extracted from the tank and is treated with air to form an ignitable mixture in the combustion unit. After ignition, the burnable material can burn and be converted into carbon dioxide and water, and the released energy is utilized in the abovementioned recovery unit in order to carry out material extraction or condensation.

DETAILED DESCRIPTION

If a fuel cell is used instead of thermal postcombustion, electric energy can also be obtained from the material in addition to the waste heat.

The invention is described below with reference to figures.

FIG. 1 shows the prior art, that is to say, diagrammatically, a method for the environmentally sound disposal of air/solvent mixtures 5 which consist of combustible vaporous or liquid waste materials, by means of a combustion unit 1, along with the discharge of the environmentally compatible exhaust air 2 occurring in the combustion unit 1 and of the generated waste heat 3 and/or current 4.

The combustion unit 1 here is a thermal postcombustion plant 9 into which an air/solvent mixture 5 is introduced. The air/solvent mixture 5 has been diluted with air to an extent such that there is no ignitable mixture present. This depleted air is delivered for thermal postcombustion. For combustion, a fuel/fuel gas 11 and/or electric energy 12, that is to say current, are/is introduced into the postcombustion plant 9. The exhaust air 2 ($CO_2/H_2O$) and the waste heat 3 are discharged from the postcombustion plant 9. It is also known to use the waste heat 3 for preheating the air/solvent mixture 1.

Figure 2:
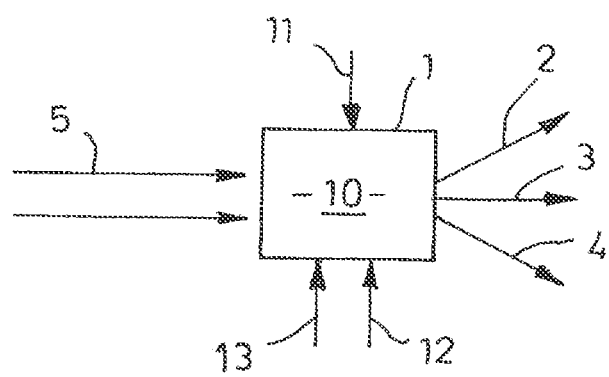
FIG. 2 is a diagram of a prior art combustion unit with a fuel-cell plant.

FIG. 2 likewise shows the prior art, except that, here, the combustion unit 1 used is a fuel cell plant 10 into which an air/solvent mixture 5 is introduced. Here too, the air/solvent mixture 5 has been diluted with air to an extent such that there is no ignitable mixture present. This depleted air is delivered to the fuel cell plant 10. A fuel/fuel gas 11, hydrogen 13 and/or electric energy 12, that is to say current, are/is introduced into the fuel cell plant 10. The exhaust air 2, the waste heat 3 and current 4 are discharged from the fuel cell plant 10.

Figure 3:
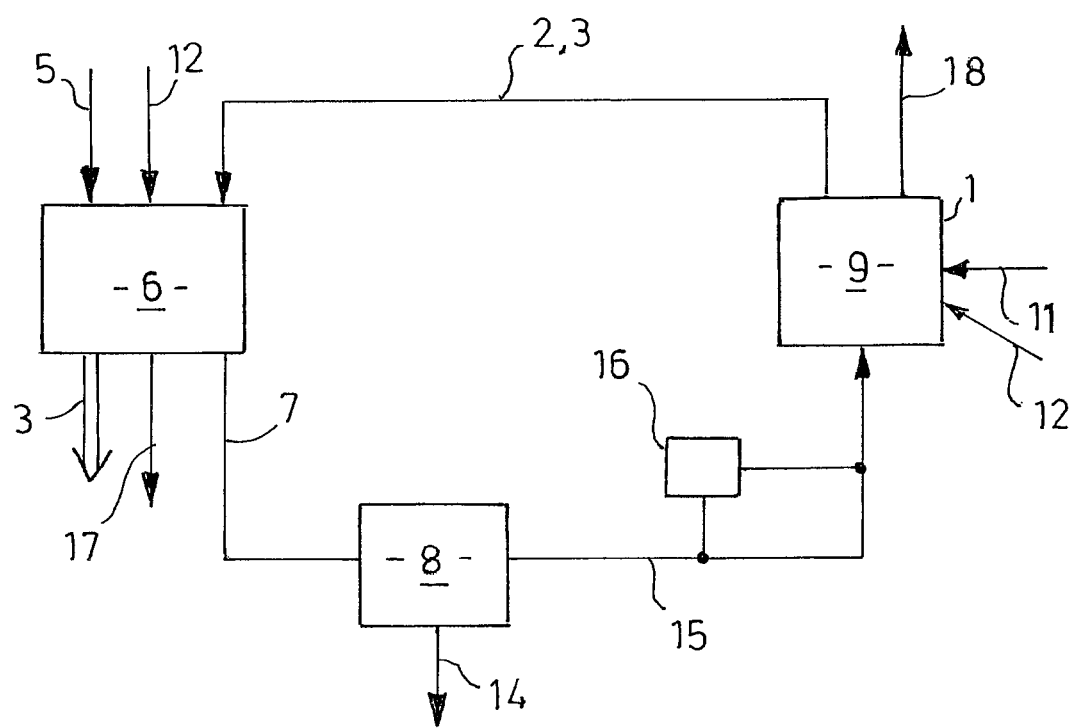
FIG. 3 shows an embodiment according to the invention.

FIG. 3 describes the coupling according to the invention of the combustion unit 1 and recovery unit 6, the combustion unit 1 carrying out a conversion of the air/solvent mixture 5 into heat energy and exhaust air or exhaust gas. The combustion unit 1 supplies the recovery unit 6 with waste heat which has been obtained from the combustible or burnable material.

Part of the air/solvent mixture 5 is thus introduced directly to the combustion unit 1, and another part or the rest is introduced into the recovery unit, and transformed in usable energy forms there and these are then introduced into the combustion unit in order to maintain combustion, that is to say the combustion process.

The recovery unit 6 separates the air/solvent mixture 5. The combustible or burnable material (for example, the condensate 7) is transferred into a tank 8, and, in turn, the combustion unit 1 can extract from this the fuel necessary for operation.

The air/solvent mixture 5 is therefore introduced into the recovery unit 6 and is condensed out there. The condensate 7 is conducted into a tank 8. In addition to the air/solvent mixture 5, exhaust air 2 and/or waste heat 3 occurring in the combustion unit 1 are/is introduced into the recovery unit 6. This exhaust air and/or waste heat, if appropriate also supplemented by electric energy 12, are/is used for material conversion or for condensation. The exhaust air 17 occurring in the recovery unit 6 is, for example, discharged from the recovery unit 6 and introduced into the combustion unit.

The condensate 7 is stored in the tank 8 until it is introduced as liquid burnable material 15 into the combustion unit 1 or is delivered for another use 14. A more extensive material conversion 16 may also be carried out optionally in a corresponding converter, in which case electric energy or process heat can be delivered for material conversion 16.

In this refinement, the combustion unit 1 is a thermal postcombustion plant 9 in which the liquid burnable material 15 is burnt. In addition, to assist the combustion process, fuel/fuel gas 11 and/or electric energy 12 may be introduced into the combustion unit 1. The exhaust air 2 and waste heat 3 from the combustion process are transferred into the recovery unit 6 where they are used for the condensation of the air/solvent mixture 5. The exhaust gas 18 ($CO_2/H_2O$) is discharged.

Figure 4:
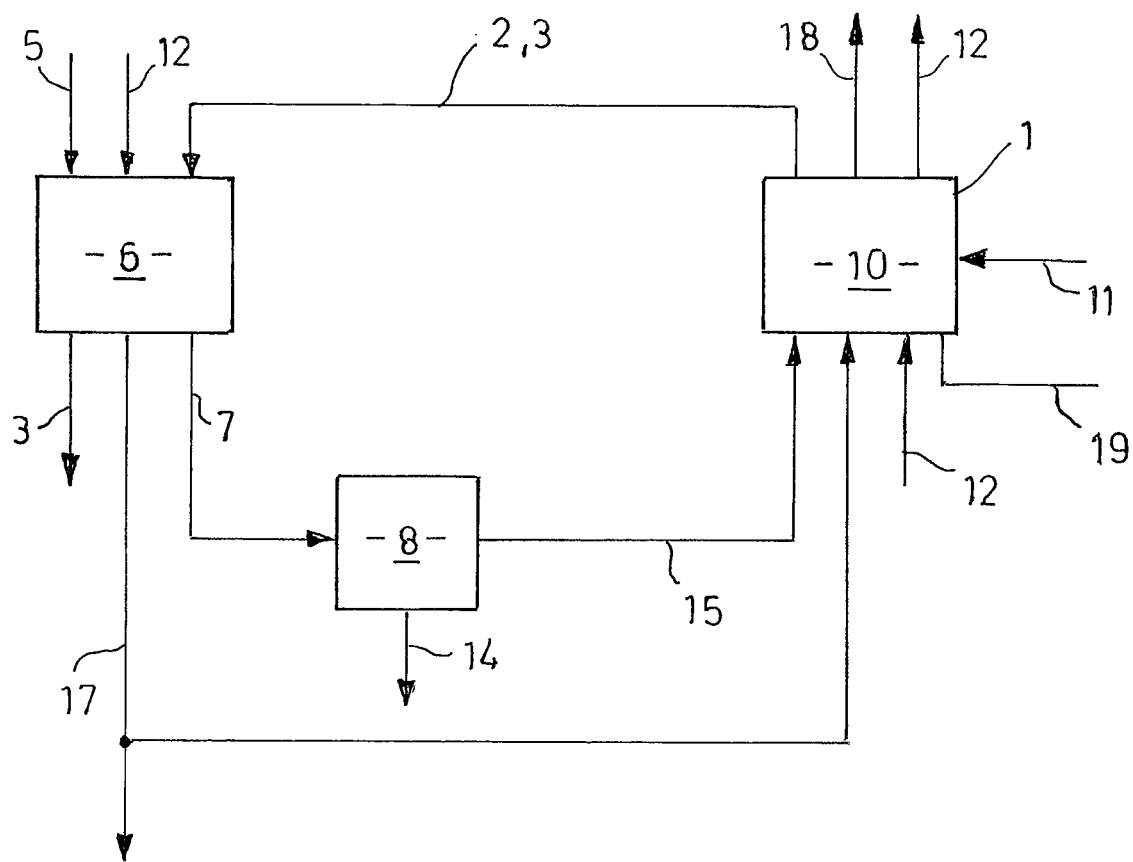
FIG. 4 shows another embodiment according to the invention.

FIG. 4 describes the coupling according to the invention of combustion unit 1, here a fuel cell plant 10 and recovery unit 6, the combustion unit 1 carrying out a conversion of the material or of the liquid burnable material 15 into electric energy 12 or heat energy 3 or exhaust air 2 or exhaust gas 18. The combustion unit 1 supplies the recovery unit 6 with waste heat 3 or exhaust air 2 which has been obtained from the combustible or burnable material 15. Furthermore, the combustion plant 1 can provide electric energy 12 for operating the plant or else for other consumers.

The recovery unit 6 separates the air/solvent mixture 5. The combustible or burnable material or the condensate 7 is transferred into a tank 8, and, in turn, the combustion unit 1 can extract from this the fuel necessary for operation.

The air/solvent mixture 5 is therefore introduced into the recovery unit 6 and is condensed out there. The condensate 7 is conducted into a tank 8. In addition to the air/solvent mixture 5, exhaust air 2 and/or waste heat 3 occurring in the combustion unit 1 are/is introduced into the recovery unit 6. This exhaust air and/or waste heat, if appropriate also supplemented by electric energy 12, are/is used for material conversion or for condensation. The exhaust air 17 occurring in the recovery unit 6, if appropriate including a remainder of the air/solvent mixture 5, is discharged from the recovery unit 6 and may optionally be delivered to the fuel cell plant 10.

The condensate 7 is stored in the tank 8 until it is introduced as liquid burnable material 15 into the combustion unit 1 or is delivered for another use 14.

In this refinement, the combustion unit 1 is a fuel cell plant 10 in which the liquid burnable material 15 is burnt. In addition, to assist the combustion process, fuel/fuel gas 11 and/or electric energy 12 and/or supply air 19 may be introduced into the combustion unit 1. The exhaust air 2 and waste heat 3 from the combustion process are transferred into the recovery unit 6 where they are used for the condensation of the air/solvent mixture 5. The exhaust gas 18 ($CO_2/H_2O$) is discharged.

Figure 5:
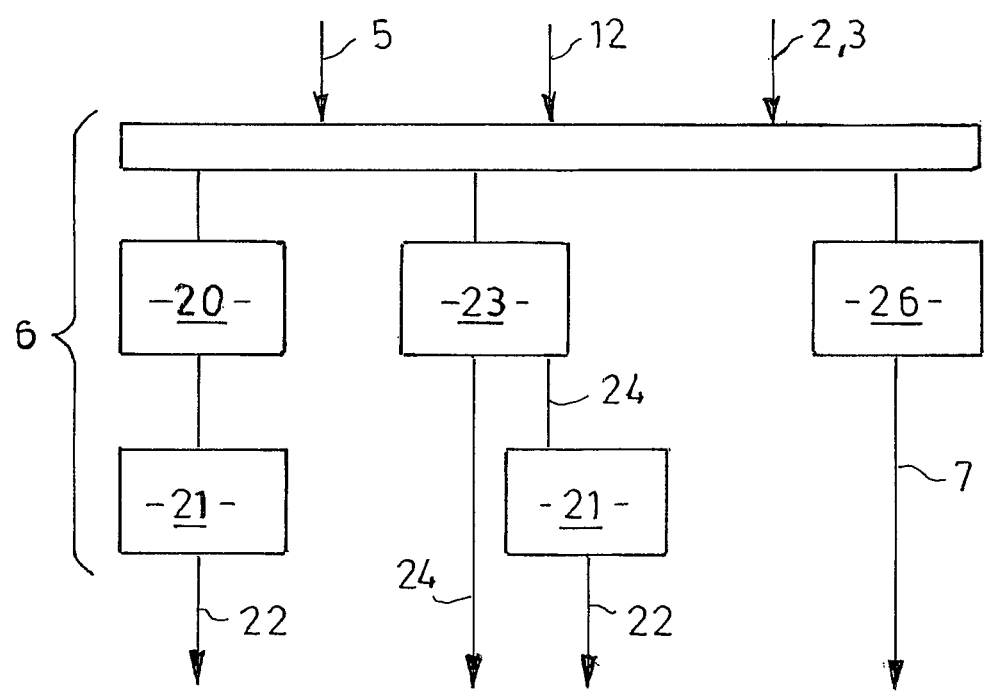
FIG. 5 is an embodiment according to the invention.

FIG. 5 shows diagrammatically the recovery plant 6 and the usable energy forms into which the air/solvent mixture 5 introduced is transformed. The air/solvent mixture 5, optionally electric energy 12 and/or exhaust air 2 and waste heat 3 from the combustion unit, are introduced as input into the recovery plant 6.

The air/solvent mixture 5 is then transformed in the recovery plant 6, for example in order to drive a Stirling engine 20 which, in turn, drives a generator 21 for the generation of current 22. In another or else additional form of use, the air/solvent mixture 5 is converted into steam 24 in a steam conversion plant 23 and the steam 24 is delivered for use. In another or else additional form of use, the air/solvent mixture 5 is condensed out in a condensation device 26, and the burnable condensate 7 obtained is conducted, for example, into the combustion unit and is burnt there or is partially delivered for another form of use.

Features of the method according to the invention, also called a plant concept below, are described below.
1. The plant concept serves for the environmentally sound disposal of mixtures of air and of combustible or burnable materials and avoids the use of additional fuel gas for the combustion of burnable or combustible materials.
2. The plant concept is characterized in that a coupling of combustion unit and recovery unit is carried out. Combustion units may be, for example, conventional thermal postcombustion plants or fuel cell plants of the most diverse possible designs or, in general, energy conversion systems which generate heat or cold or electric energy from materials. Recovery units may be, for example, absorption plants, condensation plants, inversion cold plants, adsorption plants.
3. The combustion unit does not rely on the constant concentration of combustible materials in the air mixture, but can be operated uniformly by means of the continuous extraction of combustible materials from the tank.
4. As a result of the continuous extraction of combustible materials from the tank, the plant can even be operated should the supply of air/solvent mixture or condensate or of burnable liquid material be interrupted.
5. By the use of a fuel cell plant, electrical current can also be obtained from the combustible material in addition to the waste heat.
6. The combustible material from the tank does not have to be utilized completely via the plant concept, but may optionally be partially delivered for other applications.
7. The material stored in the tank by the recovery unit may also be of non-fossil origin. One example which may be mentioned is bioethanol.
8. The essential property of the coupling of the combustion unit to the recovery unit is the conversion of waste heat into exhaust air or exhaust gas. Depending on the combustion unit used, electrical current may also be incorporated into the coupling.
9. The property of the coupling of the recovery unit to the combustion unit is the conversion of burnable or combustible materials.
10. By means of the method, pure materials can be processed from combustible or burnable materials or else mixtures of at least two different combustible or burnable materials.
11. By means of the method, pure materials can be processed from combustible or burnable materials or else mixture of at least two different combustible or burnable materials which are mixed with non-combustible or non-burnable materials, such as, for example, water.

The invention claimed is:

1. A method for the environmentally sound disposal of an air/solvent mixture, wherein the air/solvent mixture comprises combustible gaseous, vaporous or liquid waste material, comprising combusting with a combustion unit the air/solvent mixture to form a combusted air/solvent mixture; discharging environmentally compatible exhaust air from the combustion unit and generating waste heat, delivering the combusted air/solvent mixture to a recovery unit and converting the combusted air/solvent mixture into a usable energy form, and delivering the usable energy form to the combustion unit for combustion of more of said air/solvent mixture; wherein the usable energy form is a liquid burnable material.

2. A method as claimed in claim 1, wherein the usable energy form is electric current, gas, steam or a burnable condensate.

3. A method as claimed in claim 2, wherein the air/solvent mixture in the recovery unit are delivered to a Stirling engine, and current is generated, for example in combination with a generator.

4. A method as claimed in claim 2, wherein the air/solvent mixture in the recovery unit is converted into steam in a steam conversion plant, and the steam is delivered for use.

5. A method as claimed in claim 4, wherein the steam is delivered to a generator for the generation of current.

6. The method as claimed in claim 1, wherein the air/solvent mixture in the recovery unit is condensed out as condensate in a condensation device, and the burnable condensate obtained is burnt in the combustion unit.

7. The method as claimed in claim 6, wherein the waste heat generated in the combustion unit or electric current is delivered to the recovery unit.

8. The method as claimed in claim 6, wherein the condensate is conducted into a tank and is delivered to the combustion unit.

9. The method as claimed in claim 6, wherein the combustion unit is a thermal postcombustion plant.

10. The method as claimed in claim 6, wherein the recovery unit is an absorption plant, condensation plant, inversion cold plant or adsorption plant.

11. The method as claimed in claim 6, wherein the combustion unit is operated by continuously extracting condensate from a tank.

12. The method as claimed in claim 11, wherein the condensate in the tank is of non-fossil origin.

13. The method as claimed in claim 6, further comprising processing in the recovery unit pure materials from combustible or burnable materials or mixtures thereof.

14. The method as claimed in claim 6, further comprising supplying fuel gas/fuel or electrical current or supply air into the combustion unit.

15. A method as claimed in claim 1, wherein the burnable or combustible materials are removed completely or virtually completely from the air/solvent mixture, and the residual gas fraction from the mixture is delivered to the supply air of the combustion unit.

16. A method as claimed in claim 1, wherein the heat quantity occurring in the combustion unit is utilized partially or completely in order to operate a Stirling engine.

17. A method as claimed in claim 16, wherein the energy converted in the Stirling engine is utilized for drive purposes.

18. A method as claimed in claim 16, wherein the Stirling engine drives a generator which generates electric energy.

19. A method as claimed in claim 1, wherein the heat quantity occurring in the combustion unit is utilized partially or completely in order to generate steam.

20. A method as claimed in claim 19, wherein the steam obtained is utilized for drive purposes.

21. A method as claimed in claim 19, wherein the steam drives a generator which generates electric energy.

22. A method as claimed in claim 19, wherein the steam obtained is utilized for sterilization purposes.

23. A method as claimed in claim 1, wherein the heat energy delivered from the combustion unit to the recovery unit is distributed in the recovery unit to various types of use.

24. A method as claimed in claim 23, wherein, in the recovery unit, various types of use are cascaded or operated in combination.

25. The method of claim 6, wherein the condensate comprises bioethanol or biobutanol.

26. A method for the environmentally sound disposal of an air/solvent mixture, comprising combusting with a combustion unit the air/solvent mixture to form a combusted air/solvent mixture, discharging environmentally compatible exhaust air from the combustion unit and generating waste heat, delivering the combusted air/solvent mixture to a recovery unit and converting the combusted air/solvent mixture into a usable energy form, and delivering the usable energy form to the combustion unit for combustion of more of said air/solvent mixture; wherein the usable energy form is a condensate.

27. The method of claim 6, wherein the waste heat from the recovery unit is introduced into the combustion unit.

28. The method of claim 6, wherein at least one member selected from the group consisting of fuel, fuel gas and electric energy are introduced into the combustion unit.

29. The method of claim 26, wherein the waste heat from the recovery unit is introduced into the combustion unit.

30. The method of claim 26, wherein at least one member selected from the group consisting of fuel, fuel gas and electric energy are introduced into the combustion unit.

31. A method for the environmentally sound disposal of an air/solvent mixture, comprising combusting with a combustion unit the air/solvent mixture to form a combusted air/solvent mixture, discharging environmentally compatible exhaust air from the combustion unit and generating waste heat, delivering the combusted air/solvent mixture to a recovery unit and converting the combusted air/solvent mixture into a usable energy form, and delivering the usable energy form to the combustion unit for combustion of more of said air/solvent mixture, wherein the usable energy form is a liquid burnable material.

32. The method of claim 31, wherein the waste heat from the recovery unit is introduced into the combustion unit.

33. The method of claim 31, wherein at least one member selected from the group consisting of fuel, fuel gas and electric energy are introduced into the combustion unit.

34. The method as claimed in claim 7, wherein the condensate is conducted into a tank and is delivered to the combustion unit.

* * * * *